Patented Nov. 13, 1923.

1,473,966

UNITED STATES PATENT OFFICE.

ICHITARO NAMARI, OF SAKAI, OSAKA FU, JAPAN, ASSIGNOR TO MINAMI MANSHU TETSUDO KABUSHIKI KAISHA, OF TAIREN, KWANTO SHU, CHINA.

PROCESS OF MANUFACTURING A COMPOSITION CONTAINING ANHYDROUS MAGNESIUM CHLORIDE.

No Drawing. Application filed January 29, 1921. Serial No. 441,088.

*To all whom it may concern:*

Be it known that I, ICHITARO NAMARI, subject of the Emperor of Japan, residing at No. 31 Nakano-machi-higashigocho, Sakai, Osaka Fu, Japan, have invented new and useful Improvements in Processes of Manufacturing a Composition Containing Anhydrous Magnesium Chloride, of which the following is a specification.

This invention relates to an improvement in the process of manufacturing a composition containing anhydrous magnesium chloride, by melting a compound, such as carbonate, oxide, oxychloride or hydroxide of such metal, in the presence of one or more haloid salts having low melting points, the bases of such haloid salts being electropositive to magnesium. The object of this invention is to manufacture anhydrous chlorides not containing any oxide and suitable for electrolytic preparation of metallic magnesium by an easy process and from cheap raw materials, and at the same time to carry out the process most economically by repeatedly utilizing by-products such as ammonium carbonate or ammonia.

When an oxide of magnesium is heated with ammonium chloride by the dry method, a reaction as shown in the following equation will take place:—

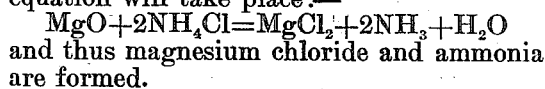

and thus magnesium chloride and ammonia are formed.

This is a well-known fact, but this reaction does not take place perfectly for the following reason. The ammonium chloride first melts at a low temperature, then gasifies, followed by dissociation, and finally begins to produce a small amount of magnesium chloride. The magnesium chloride thus produced is in a solid state owing to its high melting point, which hinders the contact of unchanged magnesium oxide with the molten ammonium chloride, and prevents the reaction between the two.

This invention is an improvement of the above process, and consists in considerably lowering the melting point of magnesium chloride by adding thereto as flux haloid salts having their bases electropositive to the magnesium, thereby making the chloride melt at a low temperature and at the same time preventing volatilization of the ammonium chloride, and causing the perfect reaction between the ammonium chloride and the magnesium compound. In this way the above mentioned defect is efficiently removed.

The following is an example of carrying out my invention into practice:—

Maintain in melted state at a temperature as low as possible a mixture of 5 parts of sodium chloride and 5 parts of potassium chloride, and add thereto gradually a mixture of 30 parts of ammonium chloride and 10 parts of magnesium oxide. Then the ammonium chloride and magnesium oxide will decompose and magnesium chloride and water will be formed, the gaseous ammonia escaping to be recovered by a process to be described later, and when the heating is stopped after all the ammonia, water and excess ammonium chloride have been driven out of the melted chlorides, anhydrous magnesium chloride mixed with chlorides of sodium and potassium containing absolutely no oxide and most suitable as electrolytic preparation for electrolysis of magnesium will be obtained.

The by-product ammonia, or ammonium carbonate which is produced when magnesium carbonate is used instead of oxide, and chlorine generated by electrolysis of anhydrous magnesium chloride, are utilized to make ammonium chloride by the following method:—It is obtained by combining ammonia or ammonium carbonate with hydrogen chloride gas which is produced by passing chlorine and steam on carbon heated to 300° C., and the ammonium chloride thus obtained is repeatedly used as a raw material in the main process.

According to this invention, it is necessary to use ammonium chloride in excess of the theoretical amount in order to prevent magnesium oxide remaining in the product, that is, in the anhydrous magnesium chloride, and the proper amount of such excess is found to be from 10 to 20% over the chemically equivalent weight of the magnesium compound used. Moreover, the decomposition of the anhydrous chloride and conversion into oxychloride by over-heating, can be easily prevented by using a flux.

Silicates and other substances, such as aluminium oxide, ferric oxide, etc., often contained as impurities in the carbonate, oxide, oxychloride, or hydroxide, used as the raw materials in this process, are so hardly soluble in hydrochloric acid that they will not be converted into chloride, except a small amount of ferric oxide, and as they are generally heavier than the chlorides produced in this process, they sink down to the bottom in the molten chloride together with a small amount of unchanged oxide and can be easily separated. Moreover, if the heat is properly maintained, ammonium chloride and ammonia will be wholly volatilized out. Thus, according to my invention, no substances added for the purpose of converting the magnesium compound into chloride remaining, as impurities without undergoing any reaction or on account of its imperfect separation, the anhydrous chloride suitable as the electrolyte preparation of metallic magnesium, can be directly manufactured from impure mineral carbonates such as magnesite. And I need not say that haloid salts used as flux in melted state act effectively and without giving any injurious result on the electrolytic preparation of metallic magnesium prepared from anhydrous chlorides according to my invention.

I am aware that before my invention, there is known a process of manufacturing anhydrous chlorides by suspending magnesium oxide, magnesium carbonate, etc., in a medium of some molten mass and passing chlorine thereinto. But not only is this process injurious to health on account of uncombined chlorine which escapes into the air, but it is necessary to make the apparatus of a material which resists chlorine. Consequently this process is very difficult to put into practice.

In my process, however, as ammonium chloride is used, there is no fear of free chlorine escaping, nor the necessity of making the apparatus with a material which resists to action of chlorine. It is therefore very evident that my invention is quite different from the known process just described.

I claim:

1. The process of manufacturing a composition containing anhydrous magnesium chloride which consists in fusing magnesium oxide by adding thereto a chloride the base of which is electro-positive to magnesium, and ammonium chloride.

2. The process of manufacturing a composition containing anhydrous magnesium chloride which consists in fusing a magnesium compound which will produce oxide when subjected to a high heat, together with a chloride of a base which is electro-positive to magnesium, and ammonium chloride.

3. The process of manufacturing a composition containing anhydrous magnesium chloride which consists in adding to magnesium oxide in fusion ammonium chloride of a quantity greater than the chemically equivalent weight of the magnesium chloride, and alkali chloride, and subjecting the mixture to heat.

4. The process of manufacturing a composition containing anhydrous magnesium chloride which consists in adding to magnesium carbonate in fusion ammonium chloride of a quantity greater than the chemically equivalent weight of the magnesium carbonate, and alkali chloride, and subjecting the mixture to heat.

5. The process of manufacturing a composition containing anhydrous magnesium chloride which consists in adding to powdered ore containing magnesium carbonate a quantity of ammonium chloride greater than the chemically equivalent weight of the magnesium carbonate contained in the ore, and alkali chloride, and maintaining the mixture in fused state.

In testimony whereof I have signed my name to this specification.

ICHITARO NAMARI.